J. B. WALKER.
TRUCK.
APPLICATION FILED OCT. 31, 1916.
1,241,481.  Patented Sept. 25, 1917.
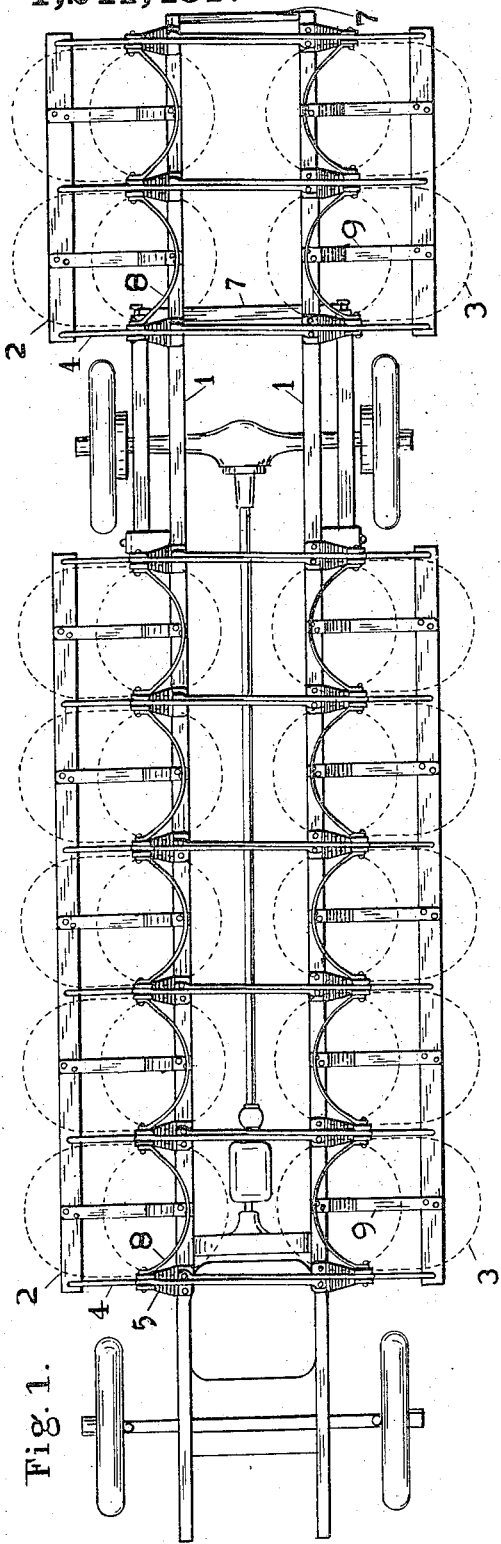
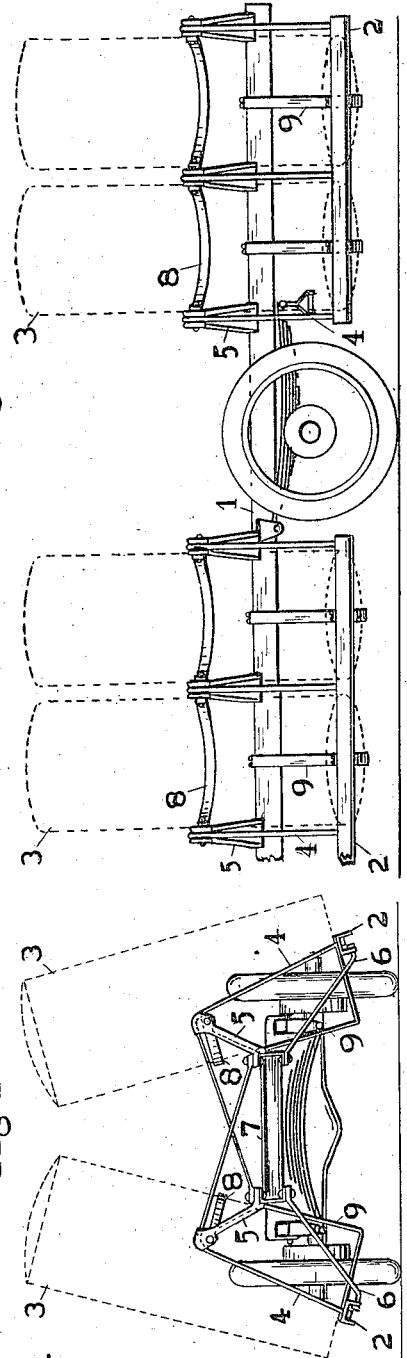
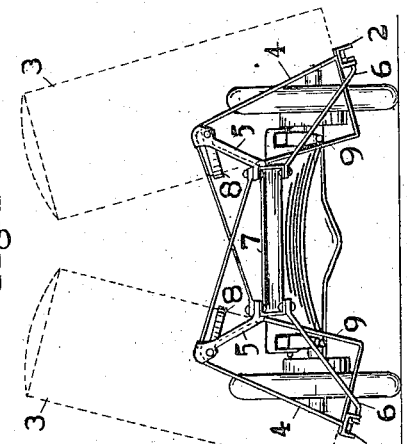
Inventor,
John B. Walker,
by Samuel W. Balch
Attorney.

UNITED STATES PATENT OFFICE.

JOHN BRISBEN WALKER, OF NEW YORK, N. Y.

TRUCK.

1,241,481.
Specification of Letters Patent.
Patented Sept. 25, 1917.

Application filed October 31, 1916. Serial No. 128,715.

*To all whom it may concern:*

Be it known that I, JOHN B. WALKER, a citizen of the United States of America, and a resident of Stapleton, in the city of New York, county of Richmond, and State of New York, have invented certain new and useful Improvements in Trucks; of which the following is a specification.

This invention relates to a truck constructed with reference to the idea of loading forms of containers from the ground without lifting bodily and carrying them preferably but not necessarily in an inclined position held in place by gravity. This is effected by the locating of a supporting rail on wagons, or automobiles, a few inches above the ground, so that instead of being compelled to raise bodily the container to be loaded, from the ground, the loading is accomplished by pulling the container forward on one edge, giving it a slight twist so as to bring the opposite edge over the supporting rail, and then pushing it back into a frame shaped to suit the container holding the particular class of merchandise being handled; the weight being chiefly carried upon the supporting rail. In this way there is saved the force required to lift the container off the ground and heavy containers may be loaded easily and expeditiously and unloaded in the same expeditious way.

The object of this invention is thereby to provide a method for the rapid handling of such materials as are suited to transportation in containers with economy of physical effort in loading and in unloading. A further object is to provide a truck having these conveniences which may be organized with a minimum of dead weight and a diminution in cost of the vehicle thereby permitting a substantial increased capacity for the materials to be transported. Materials suitable for transportation by the truck herein set forth and for handling in the manner described include ashes and garbage, which are thereby collected and removed in a safe and sanitary manner; and also many classes of merchandise, such as coal, grain, brick, sand, earth, liquids, such small package goods as may be suitably placed in the containers, and sugar, flour and agricultural produce, for which standard containers are established, to the dimensions of which the truck may be especially proportioned with the organization set forth.

In the accompanying sheet of drawings which forms a part of this application,

Figure 1 is a plan of an automobile truck embodying my invention.

Fig. 2 is an end view of the same.

Fig. 3 is a side elevation, the forward portion being broken away.

The truck comprises the usual side frames 1, 1 which overlie the wheel-axles. Suitably connected to these frames are longitudinal supporting rails 2, 2 below the level of the wheel-axles which form the chief supporting means for sustaining the weight of containers 3, 3, shown in dotted lines, and their contents. Two of these rails are shown on each side of the truck. One extends from a point even with the rear of the power plant to a point just forward of the rear wheel; and one from a point in the rear of the rear wheel to the end of the truck. Between the main side frames and the longitudinal supporting rails are lateral connections consisting of cantalivers, each comprising an upper tension chord 4, a strut 5, and a lower compression chord formed by a compression rod 6 in conjunction with cross members 7, 7 of the truck frame. These cantalivers are so spaced that a container may be placed between each adjacent two. The upper tension chord of each cantaliver is a rod connected at one end to the supporting rail and extending upwardly to the upper end of the strut, thence over a groove in the top of the strut, and back to the far side frame of the truck to which the other end is attached. The portion of each rod between the supporting rail and the strut serves as a guard to confine the adjoining containers against longitudinal displacement along the rail. Bands 8, 8 have their ends connected to the cantaliver struts. These are bent to the curves of the container bodies and each serves as a support for the side of a container in an inclined position. A strap 9 with a right-angle bend is connected at one end to the supporting rail midway between each two adjacent cantalivers between which it is intended to carry a container, and the strap extends under the container bottom and then upwardly to the side frame to which its other end is connected and at its angle serves as a support for the lower corner of the container.

By reason of the low position of the longitudinal supporting rail on which the containers rest, the placing thereon of the loaded containers is readily effected without lifting them bodily from the ground, it being possible to swing them into place from the ground by a motion of the arm, and they are removed in a similar manner with a minimum of physical effort. In the collecting of garbage, the containers will be deposited at convenient places and the garbage deposited in these from the individual buckets, and when filled they can be quickly loaded on the truck and carried off without exposure of the contents.

What I claim as new, and desire to secure by Letters Patent of the United States, is—

1. In a four-wheeled vehicle, the combination of main side frames overlying the wheel-axles, supporting means below the level of the wheel-axles for the support of a plurality of containers in inclined positions on each side of the vehicle, and lateral connections between the side frames and the container-supporting means, substantially as described.

2. In a four-wheeled vehicle, the combination of main side frames overlying the wheel-axles, supporting means below the level of the wheel-axles for the support of a plurality of containers on each side of the vehicle, and lateral connections between the side frames and the container-supporting means spaced so that a container may be placed between each two adjacent lateral connections, substantially as described.

3. In a four-wheeled vehicle, the combination of main side frames overlying the wheel-axles, supporting means below the level of the wheel-axles for the support of a plurality of containers on each side of the vehicle, and lateral connections between the side frames and the container-supporting means spaced so that a container may be placed between each two adjacent lateral connections and confined thereby against longitudinal displacement, substantially as described.

4. In a four-wheeled vehicle, the combination of main side frames, longitudinal supporting rails below the level of the wheel-axles for the support of a plurality of containers on each side of the vehicle, and lateral cantaliver connections between the side frames and the supporting rails, substantially as described.

5. In a four-wheeled vehicle, the combination of main side frames overlying the wheel-axles, longitudinal supporting rails below the level of the wheel-axles for the support of plurality of cylindrical containers on each side of the vehicle, lateral cantaliver connections between the side frames and the supporting rails including struts from the side frames to the upper chords of the cantalivers, and a band connected between the struts of each two adjacent cantalivers for the support of the side of a container in an inclined position, substantially as described.

6. In a four-wheeled vehicle, the combination of main side frames overlying the wheel-axles, longitudinal supporting rails below the level of the wheel-axles for the support of a plurality of containers on each side of the vehicle, lateral connections between the side frames and the supporting rails spaced so that a container may be placed between each two adjacent lateral connections, and a strap connected to the side frame and the supporting rail between each two adjacent lateral connections for forming a support for the corner of the container, substantially as described.

7. In a four-wheeled vehicle, the combination of main side frames overlying the wheel-axles, longitudinal supporting rails below the level of the wheel-axles for the support of a plurality of cylindrical containers on each side of the vehicle, lateral cantaliver connections between the side frames and the supporting rails including struts from the side frames to the upper chords of the cantalivers, a band connected between the struts of each two adjacent cantalivers for the support of the side of a container in an inclined position, and a strap connected to the side frame and the supporting rail between each two adjacent cantalivers for forming a support for the corner of a container, substantially as described.

Signed at New York, N. Y., this thirtieth day of October, 1916.

JOHN BRISBEN WALKER.

Copies of this patent may be obtained for five cents each, by addressing the "Commissioner of Patents, Washington, D. C."